Feb. 12, 1957   C W. MUSSER ET AL   2,780,961
DEVICES FOR MOVING OBJECTS SUCH AS AIRCRAFT CANOPIES
Filed May 7, 1953   2 Sheets-Sheet 1

INVENTOR.
C WALTON MUSSER
FRANCIS W. DIETSCH
BY
W.E. Thibodeau, A.W. Dew
and H.I. Forman
ATTORNEYS.

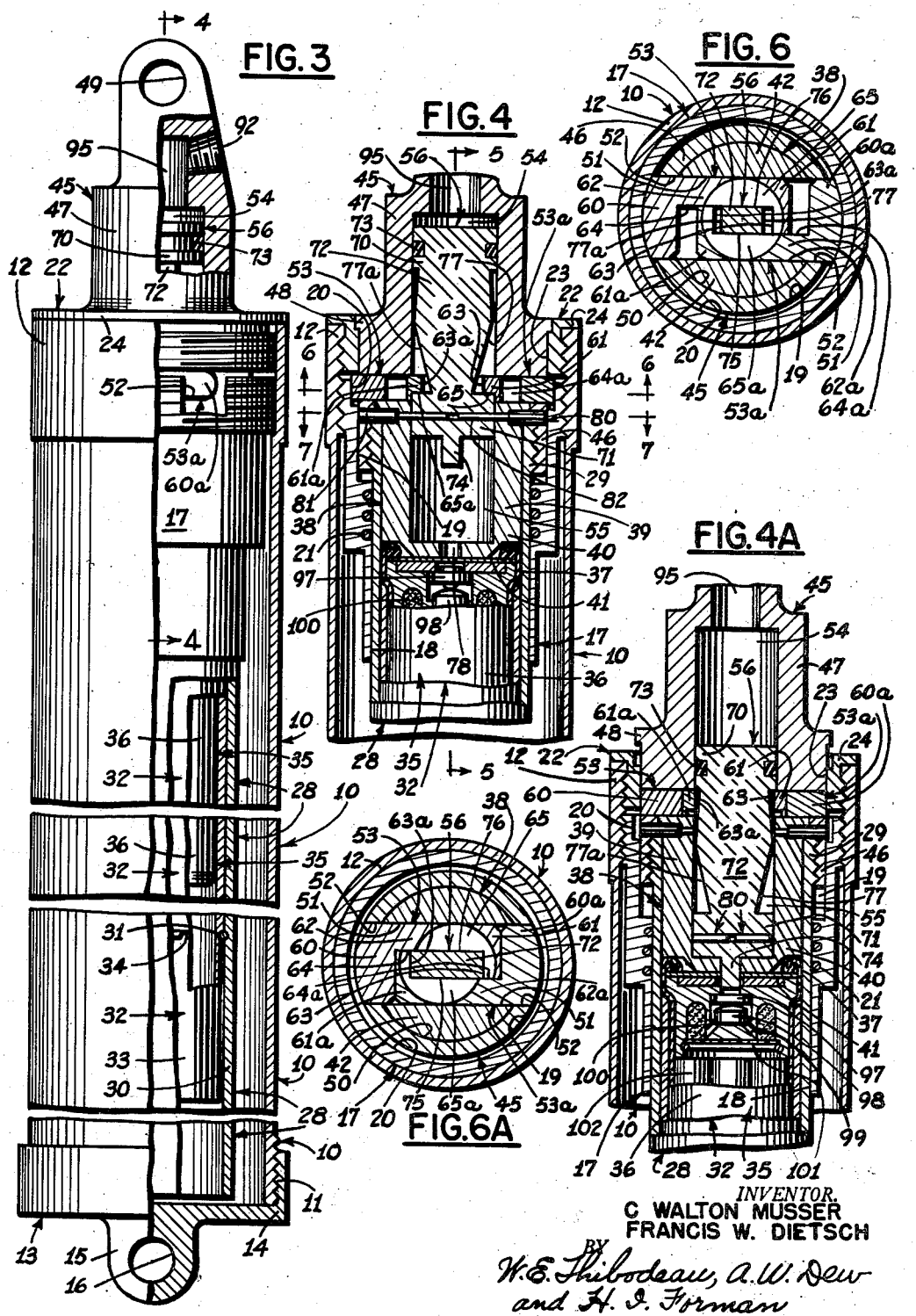

United States Patent Office 2,780,961
Patented Feb. 12, 1957

2,780,961

DEVICES FOR MOVING OBJECTS SUCH AS AIRCRAFT CANOPIES

C Walton Musser and Francis W. Dietsch, Philadelphia, Pa., assignors to the United States of America as represented by the Secretary of the Army Application May 7, 1953, Serial No. 353,701

11 Claims. (Cl. 89—1)

(Granted under Title 35, U. S. Code (1952), sec. 266)

The invention described herein may be manufactured and used by or for the Government for governmental purposes without the payment of any royalty thereon.

Broadly stated, our invention relates to expansible-chamber type motors. Although not limited solely thereto, our invention has particular reference to a device for rapidly moving the canopy from the cockpit opening of an airplane in time of emergency during flight, in order that the pilot later may gain exit from the airplane.

Accompanying the present extensive use of closed cabin airplanes capable of flying at high velocities and altitudes is the problem of providing for the safe exit of the pilot, and others aboard, at time of emergency during flight. In airplanes of this type, "bailing out" (i. e., abandoning the airplane during flight) can no longer be performed as it was in the past. In most aircraft flown today, the action of speed-generated forces on flying personnel makes emergency exit during flight extremely difficult, if not impossible, unless done by some means providing for forcible ejection.

As a result, emergency exit from airplanes now in use resolves itself into two basic operations: first, the canopy must be very rapidly moved from the cockpit opening; second, the pilot must be forcibly ejected from the airplane through that opening.

Those skilled in the art know of the enormous forces which act on an airplane canopy, even when fully closed, as the craft is flown and maneuvered at high speeds. Even though the canopy be streamlined those forces act in many directions simultaneously, sometimes tending to force the canopy open, sometimes tending to hold it closed, sometimes tending to move it sideways of the airplane's fuselage. It is therefore obvious that opening the canopy can not be satisfactorily effected by the pilot's own strength, because many times the pilot is unable, for one reason or another, quickly to move the canopy sufficiently far to allow his exit from the airplane.

Successful opening of the canopy during flight requires a very quick acting device because, once started, even if open only a very small amount, the action of the above-mentioned forces may become much stronger. In fact, with slowly operating canopy moving devices, canopies have been known to break into pieces and be torn from the airplane during opening, with resulting injury to aircraft personnel.

To build a purely mechanical or electromechanical canopy opening device to furnish sufficient energy to open the canopy quickly under all conditions likely to be encountered would require a prodigiously large, expensive and heavy mechanism. This, of course, is prohibitive in aircraft equipment. Our present invention, however, satisfactorily fulfills all requirements including the minimization of weight and bulk which is so objectionable, by embodying chemico-mechanical principles presently to be explained.

Forcible ejection from the airplane is presently practiced in many well known manners which form no part of our invention under discussion. One means in widespread use is in the form of a catapult which is secured to the seat occupied by the pilot. When emergency exit from the airplane becomes necessary, the catapult is activated to eject forcibly the seat and the pilot therein from the airplane through the previously uncovered cockpit opening.

In essence, our novel device comprises an outer tube closed at one end, but open at the opposite end. Slidably fitting inside the outer tube's open end is an inner tube also closed at one end, but open at the opposite end. In fitting together, the inner tube's closed end extends beyond the outer tube's open end; therefore, the closed ends of the respective inner and outer tubes form the longitudinal extremities of our device.

Slidably accommodated in the inner tube's closed end for radial movement into and out of locking engagement with the outer tube's open end are a plurality of latches. When these latches are in locking engagement with the outer tube no appreciable relative axial movement between the inner and outer tubes is possible, however, rotational freedom between those tubes is possible; but, when the latches are not in locking engagement with the outer tube, relative axial movement, as well as rotational freedom, between the tubes is possible.

The latches are moved out of locking engagement with the outer tube by the movement of a firing pin with which they are interengaged. This firing pin is also slidably accommodated in the inner tube's closed end, and, subsequent to moving the latches out of locking engagement with the outer tube, also serves to detonate an explosive cartridge contained within the inner tube.

Movement of the firing pin so as to cause movement of the latches and detonation of the explosive cartridge results from the action on the firing pin of energy supplied in fluid form to our device from an external source. Detonation of the explosive cartridge supplies sufficient energy to cause relative axial movement between the inner and outer tubes.

At installation of our device in the airplane, the outer tube is mounted upon a base slidably supported on guide rails forming part of the airplane structure, while the inner tube is attached to the airplane's canopy and is also connected to the means mounted in the canopy for supplying energy to our device's firing pin. This energy may, preferably, be in the form of a liquid or a gas, although mechanical means could also be used for furnishing energy to the firing pin. This manner of installation allows the canopy to be opened and closed in the usual manner to permit normal ingress and egress of the pilot before and after flight.

When it becomes necessary to move the canopy from the cockpit opening during flight in preparation for emergency exit from the airplane, the firing pin within the inner tube is energetically moved, as by hydraulic or pneumatic force, against the explosive cartridge contained within the inner tube. However, before the firing pin strikes the explosive cartridge, initial movement of the pin causes the latches to move out of locking engagement with the outer tube so that the inner and outer tubes are thereby no longer locked together against axial movement relative to each other. That done, the firing pin then detonates the explosive cartridge. Gas pressure resulting therefrom then builds up within the catapult practically instantaneously and forces the inner and outer tubes to move apart from each other in an axial direction. During this action, the canopy attached to the inner tube is quickly and positively moved from the canopy opening, thereby providing an avenue for subsequent exit of the pilot from the airplane.

One object of our invention is to provide a device for quickly and positively moving the canopy from the cockpit opening of an airplane when emergency exit therefrom during flight becomes necessary.

Another object is to provide a device of the character mentioned which, although mounted ready for use in the airplane, does not interfere with the normal opening and closing of the canopy before and after flight.

A further object is to provide a device for the purpose mentioned whose operation results from the action on the device's firing pin of energy supplied in fluid form.

A still further object is to provide a device for the aforesaid purpose in which initial movement of the firing pin serves to unlock the device for subsequent operation, and terminal movement of the same firing pin serves to detonate an explosive cartridge for supplying sufficient energy to cause the device's operation and consequent removal of the canopy from the cockpit opening.

The foregoing and other objects and advantages of our invention will become apparent from an inspection of the following description and the accompanying drawings which describe and show, respectively, one embodiment of our invention installed in an airplane. It must be understood, however, that this embodiment and practical application have been chosen for illustrative purposes only, and that other modified and varied embodiments and practical applications are feasible without departing from the spirit and scope of our original concept.

In the drawings:

Fig. 1 is a side view, in light solid line, of a portion of the fuselage of a representative airplane, including the canopy, showing our device installed. The canopy is indicated to be in the closed position by broken line, and to be in the partially open position by light solid line. However, as will be explained later, this movement of the canopy is not effected by the operation of our invention.

Fig. 3 is a side view of our inventive device, dismounted from the airplane, partly broken away and partly sectioned to expose most of the device's components.

Fig. 4 is a partial vertical cross-section taken along line 4—4 of Fig. 3 to show internal construction and positional relationships existing between components when the device's firing pin is in what we shall refer to as the "retracted" (i. e., in readiness for firing) position. For convenience of drawing, it has been assumed that Fig. 3 was not partly broken away and partly sectioned as shown in that figure.

Fig. 4A is similar to Fig. 4, but shows positional relationships existing between components shortly after the firing pin has moved to what we shall refer to as the "firing" position (i. e., to the position causing detonation of the device's explosive cartridge), and, shortly after the inner and outer tubes have begun to move axially apart.

Figure 5:
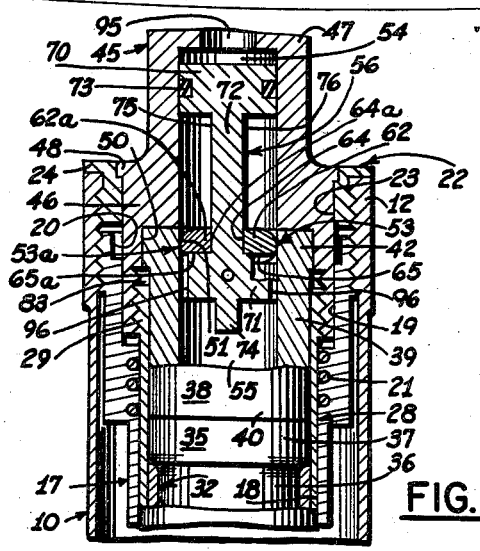

Fig. 5 is a vertical cross-section taken along line 5—5 of Fig. 4 to show additional details of internal construction and of positional relationships existing between components while the firing pin is in the retracted position. For completeness of drawing, the right half of this figure has been added, but those familiar with reading drawings know that, technically, this right half would not actually be seen in a section along line 5—5 of Fig. 4.

Fig. 6 is a horizontal cross-section taken along line 6—6 of Fig. 4 to show further details of internal construction and of positional relationships existing between components when the firing pin is in the retracted position. For the same reason stated in connection with Fig. 5, the lower half of this figure has been added.

Fig. 6A is similar to Fig. 6, but shows positional relationships existing between components after the firing pin has been moved to the firing position.

Figure 7:
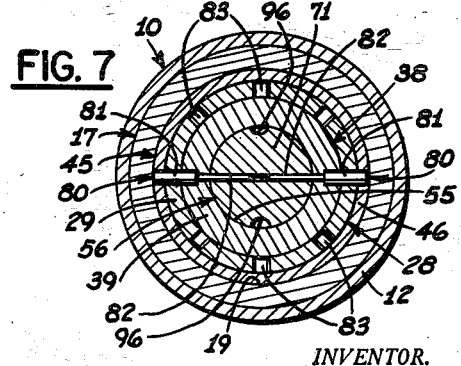

Fig. 7 is a horizontal cross-section taken along line 7—7 of Fig. 4 to show more details of internal construction and positional relationships existing between components when the firing pin is in the retracted position. For the same reason stated in connection with Figs. 5 and 6, the lower half of this figure has also been added.

*Outer tube, lower cap, bearing tube, and stop ring*

The basic structural member of our invention is the outer tube 10 (see Figs. 1 to 7). This tube is externally threaded at the lower end 11 (i. e., toward the bottom of the drawing sheet, as shown in Fig. 3) and is internally threaded at its upper end 12 (i. e., toward the top of the drawing sheet, as shown in Figs. 3 to 5).

Figure 1:
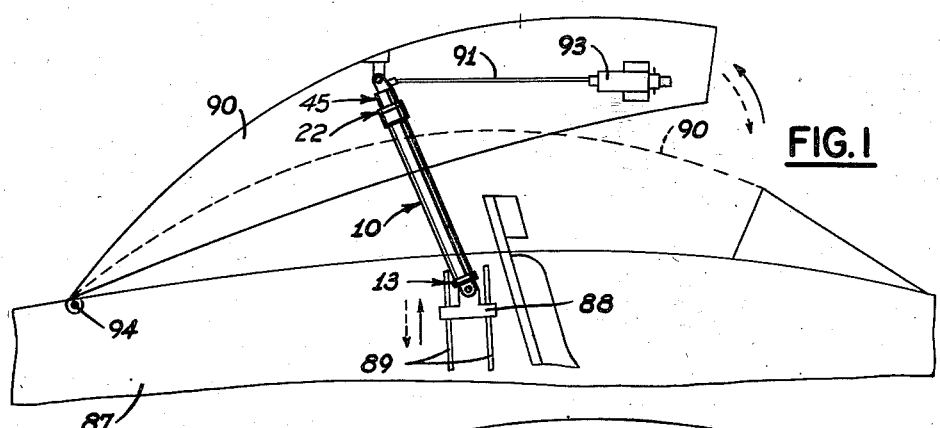
Figure 2:
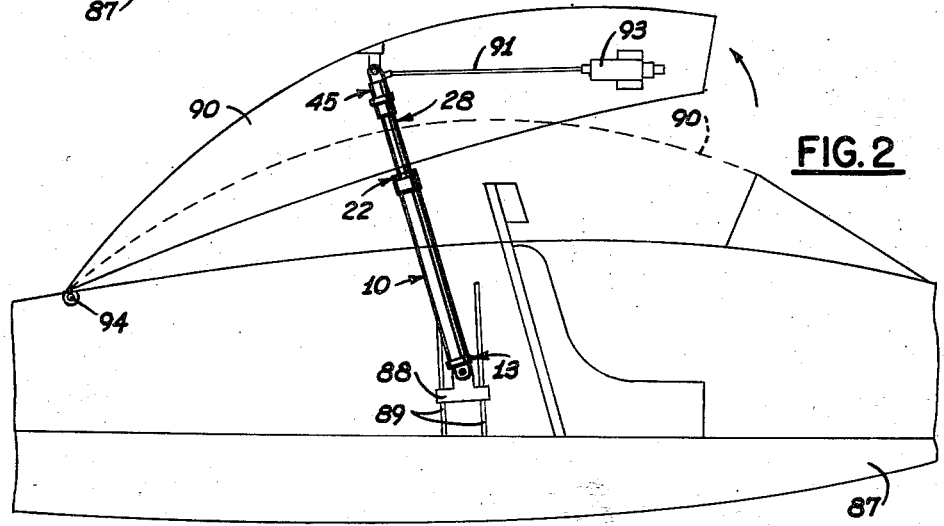
Fig. 2 is similar to Fig. 1, but movement of the canopy here is being effected by the operation of our invention.

Threadedly attached to the exterior of the outer tube's lower end in sealing relationship thereto is the lower cap 13 (see Figs. 1 to 3). Projecting from the closed end 14 of this cap is the lug 15 through which extends the opening 16 (see Fig. 3). This opening is provided for later pivotally mounting the outer tube in the airplane, although that tube may also be mounted in the airplane in any convenient manner other than by a pivotal connection.

Threadedly attached to the interior of the outer tube's upper end, also in sealing relationship thereto, is the externally threaded bearing tube 17 (see Figs. 3 to 7). This tube is seated in the outer tube's upper end, and is supported substantially concentrically within that tube. As shown in Figs. 4, 4A and 5, the bearing tube is provided interiorly with the three concentric bores 18, 19 and 20, in the first named of which the helical sealing member 21 is located in an accommodating helical groove.

Also threadedly attached to the interior of the outer tube's upper end is the stop ring 22 (see Figs. 1 to 5) having the bore 23 (see Figs. 4, 4A and 5) which is substantially continuous with the bearing tube's bore 19. Exteriorly, the stop ring is provided with the flange 24 which is seated against the outer tube's upper end (see Figs. 3 to 5).

*Inner tube, circular retaining spring and spacer sleeve*

Slidably fitting inside the bearing tube's bore 18 is the inner tube 28 (see Figs. 2 to 5, and 7). As shown in Figs. 4, 4A and 5, the upper end 29 of this tube is of somewhat larger outside diameter than the remainder of the tube, and is also exteriorly threaded. Located in an accommodating groove inside the inner tube 30, is the circular retaining spring 31 (see Fig. 3) whose inside diameter is somewhat less than that of the inner tube's bore.

Inside the inner tube is a spacer sleeve 32 (see Figs. 3 to 5), its upper end snugly secured therein, and its lower end 33 conveniently reduced in diameter to fit inside the circular retaining spring (see Fig. 3). There is thus formed in the spacer sleeve's exterior surface the shoulder 34 which limits that sleeve's insertion into the inner tube.

*Explosive cartridge, plug and upper cap*

Contained partly inside the inner tube and partly inside the spacer sleeve is the explosive cartridge 35 (see Figs. 4, 4A and 5). The particular construction and mode of operation of this cartridge does not form part of the presently discussed invention, but, for convenience of explanation, various of the cartridge's components will be mentioned as the description of our invention proceeds. In the above named figures it can be seen that the body portion 36 of the cartridge is contained within the spacer sleeve, while the somewhat larger diametered head portion 37 is contained within the inner tube. As a result of this arrangement, the cartridge's head end is seated against the spacer sleeve's upper end.

Adjacent the explosive cartridge's head portion is the plug 38 (see Figs. 4 to 7). The body 39 of this plug fits inside inner tube 28 and is adapted, at the lower end 40, to abut the cartridge's head portion and also the closing disc 41 forming part of the cartridge (see Figs. 4 and 4A). The upper end 42 of the plug is somewhat larger in diameter than the plug's body and therefore extends outside the inner tube's upper end 29 (see Fig. 5).

Threadedly attached to the exterior of the inner tube's upper end is the upper cap 45 (see Figs. 1 to 7). This cap comprises the body portion 46, which is slidably accommodated, partly in bearing tube 17 and partly in stop ring 22 (see Figs. 4, 4A and 5), and the shank portion 47 which issues from the body portion's upper end and extends beyond the stop ring (also see Figs. 4, 4A and 5). As also shown in those figures, the body portion is provided with the flange 48 which fits into an accommodating recess in the stop ring's bore 23; and, as shown in Fig. 3, the shank's free end is provided with the opening 49. This opening serves later to accommodate means for connecting inner tube 28 to the airplane's canopy. With the upper cap attached to the inner tube, the plug's upper end 42 becomes accommodated in the recess 50 provided in the upper cap's body (see Figs. 5, 6 and 6A).

Slidably accommodated in the diametrically transverse groove 51 in the plug's upper end 42 (see Figs. 5, 6 and 6A) and in the diametrically opposed openings 52 in the upper cap's body 46 (see Figs. 6 and 6A) are the latches 53 and 53a (see Figs. 4 to 6A). Also slidably accommodated, but partly in the upper cap's axial recess 54 (see Figs. 4, 4A and 5) and partly in the plug's coaxial recess 55 (see Figs. 4, 4A, 5 and 7) is the firing pin 56 (see Figs. 3 to 7). This firing pin is so interengaged with the latches that movement of the firing pin to one position allows the latches to project from the upper cap's body; and movement of the firing pin in the opposite direction causes the latches to be withdrawn into the upper cap's body. The latches and the firing pin will be described next under separate headings.

Latches

Latches 53 and 53a are substantially identical to each other and therefore have been identified by the same numerical reference number. However, in order to facilitate explanation and understanding of our invention, the letter "a" has been suffixed to the numerical reference number identifying one of the latches. For the same reason, each corresponding characteristic of those latches will be identified by a reference number with respect to one latch and by the same reference number having the letter "a" suffixed thereto with respect to the other latch.

Referring to Figs. 6 and 6A which show the latches in horizontal cross section along with other details, it can be seen that latches 53 and 53a have the corresponding wide outer ends 60 and 60a, the narrower inner ends 61 and 61a, and the still narrower intermediate portions 62 and 62a, respectively. As there shown the outer ends are arcuate in shape, having substantially the same radius as that of the bearing tube's bore 20. The latches' inner ends are provided with the sides 63 and 63a respectively, and the intermediate portions are provided with the sides 64 and 64a, respectively.

Notice also, in Figs. 6 and 6A, how the latches interfit with each other, and how the sides 63, 63a, 64 and 64a of the latches' inner ends and intermediate portions respectively surround firing pin 56.

Latches 53 and 53a are capable of being in one of two positions, both latches being in one or the other position at any particular time. Those positions are: the "locked" position best shown in Figs. 4 and 6, and the "unlocked" position shown in Figs. 4A and 6A. The latches are placed in the locked position when our device is assembled, and are moved to the unlocked position, in a manner later to be described, only when the device is operated.

When the latches are in the locked position, outer ends 60 and 60a of the respective latches pass through the upper cap's openings 52 and extend into the bearing tube's bore 20 (see Figs. 4 and 6). In so doing the outer ends of the latches overlap stop ring 22 (see Fig. 4). As a consequence, no appreciable axial movement of upper cap 45, and inner tube 28 joined thereto, relative to outer tube 10 is possible.

When the latches are in the unlocked position, the outer ends of the respective latches do not extend into the bearing tube's bore 20 (see Figs. 4A and 6A) and do not overlap the stop ring (see Fig. 4A). As a consequence of this relationship, axial movement of the upper cap and the inner tube joined thereto, relative to the outer tube, is possible. In fact, Fig. 4A shows some such movement as having occurred.

Attention is also called to the corresponding, coplanar, arcuate, stepped in portions 65 and 65a on the lower surfaces of the respective latches (see Figs. 4 and 5 to 6A). As Figs. 4 and 6 show, these surfaces become continuous to create a circular recess in the latches when the latches are in the locked position. The purpose for this condition will be mentioned later when firing pin 56 is described.

Firing pin

Firing pin 56 has the cylindrical upper and lower end portions 70 and 71, respectively, which are connected together by intermediate portion 73 (see Figs. 4, 4A and 5). The upper end portion is provided with the resilient sealing ring 73 and the lower end portion is provided with the axially located firing tip 74 which projects downwardly therefrom. The intermediate portion comprises the parallel flat sides 75 and 76 (see Figs. 5, 6 and 6A) and the beveled sides 77 and 77a (see Figs. 4 and 4A). These beveled sides diverge outwardly (i. e., away from the firing pin's axis) from the bottom to the top of those drawing figures and have substantially the same slope relative to the firing pin's axis. They are identified by the same numerical reference character, one having the letter "a" suffixed thereto in order to facilitate later description. As shown in Figs. 6 and 6A, intermediate portion 72 is rectangular in horizontal cross section, but because of the beveled sides 77 and 77a, the area of the rectangle varies depending upon where the horizontal cross section is taken.

Firing pin 56 is capable of being in one of two positions: the earlier mentioned retracted position shown in Figs. 3, 4, 5, 6 and 7; or the earlier mentioned firing position shown in Figs. 4A and 6A. The firing pin is placed in the retracted position at the time of assembly of our device, and is moved to the firing position, in a manner later to be described, at the time of operation of the device.

When the firing pin is in the retracted position, part of that pin's lower end portion is accommodated in the circular recess formed by the coplanar stepped in portions 65 and 65a of the respective latches (see Figs. 4 and 5). This enagement between the firing pin and the latches prevents the outer ends of the latches from moving radially inward from the locked position.

As the firing pin is moved to the firing position two other actions occur in sequence: first, the outer ends 60 and 60a of the respective latches 53 and 53a are simultaneously moved radially inwardly; second, explosive cartridge 35 is detonated. Inward radial movement of the outer end 60 of latch 53 is caused by the action of the firing pin's beveled side 77 against that latch's side 63; and inward radial movement of the outer end 60a of the latch 53a is similarly caused by the action of the firing pin's beveled side 77a against that latch's side 63a. As a consequence of the first action, upper cap 45 and inner tube 28 attached thereto are free to move axially out the outer tube 10. Detonation of the explosive cartridge, which will be explained later, is caused by the firing pin's tip 74 which passes through the opening 78 in plug 38 (see Fig. 4) and forcefully strikes the explosive cartridge. As a consequence of this action, sufficient energy is released from the cartridge to move the inner tube and the co-joined upper cap axially from the outer tube, thus moving the canopy from the cockpit opening.

Shear pins

Serving to prevent relative rotation between upper cap 45, inner tube 28, and plug 38, and also serving to maintain firing pin 56 releasably in the retracted position are the shear pins 80 (see Figs. 4, 4A, and 7), each comprising the body portion 81 and the frail shank portion 82 (see Fig. 7). The body portion of each shear pin passes through an accommodating opening in the upper cap's body portion 46, through one of a plurality of the "U"-shaped radially extending castellations 83 (see Fig. 7) located in the inner tube's upper end 29, and into an accommodating opening in part of the wall of the plug's body; and the frail, shank portion of each shear pin passes through the remainder of the wall of the plug's body portion and into an accommodating opening in the firing pin's lower end portion 71.

Installation in airplane

Referring to Figs. 1 and 2, outer tube 10 is mounted in the airplane 87 by attaching lower cap 13 to the base plate 88 in any convenient manner. Connection between the lower cap and the base plate can be accomplished through the use of the lower cap's opening 16 so that the outer tube is mounted for pivotal movement on the base plate. This base plate is slidable along the guide rails 89 forming part of the airplane structure. Inner tube 28 is connected to the canopy 90 by attaching upper cap 45 to the canopy in any convenient manner. Connection between the canopy and the upper cap can be accomplished through the use of the upper cap's opening 49 so that the inner tube is connected for pivotal movement to the canopy. Next, one end of the conduit 91 is connected to upper cap 45 through the tapper opening 92 (see Fig. 3). Referring back to Figs. 1 and 2, the other end of the conduit is connected to the initiator 93 conveniently located in the canopy. The initiator per se does not form a part of the invention being described, nor are any of the initiator's elements necessary to the description of our invention. It will suffice to say that the initiator, when activated, furnishes sufficient energy, in fluid form, to cause substantially simultaneous operation of our device, in a manner later to be described.

Although our device is mounted in the airplane, is connected to the canopy, and is attached to the initiator as just described, it does not interfere with the normal opening and closing of the canopy in the usual manner to permit entering and leaving the airplane before and after flight. For example, referring to Fig. 1, when the canopy is moved from its position indicated by dotted line in the direction indicated by the light solid arrow toward the open position (not shown), it pivots about the hinge 94 moving upper cap 45 and co-joined inner tube 28 along with it. Since no relative axial movement between the upper cap and the outer tube is possible, by virtue of the locking engagement between latches 53 and 53a and the outer tube, that tube is moved along with the canopy. This action, therefore, moves base 88 along guide rails 89 in the direction indicated in Fig. 1 by the light solid arrow adjacent the base's left end. Still referring to Fig. 1, when the canopy is moved in the direction indicated by the broken arrow adjacent the canopy's right end toward the closed position, also indicated by broken line, the base is moved along the guide rails in the direction indicated by the broken arrow adjacent the base's left end.

The particular installation here described is dictated by the fact that the canopy is connected to the airplane by hinge 94 and further by the fact that our device must not interfere with normal opening and closing of the canopy. Although a hinged canopy is shown in the drawing figures, our invention works equally as well on those canopies which are moved from the cockpit opening by a rectilinear motion.

Operation

When the necessity arises for an emergency exit from the airplane during flight, initiator 93 is activated to generate an energy surge. This energy passes from the initiator, through conduit 91 (see Figs. 1 and 2), through the recess 95 (see Figs. 3 to 5) and into recess 54 (also see Figs. 3 to 5). Shear pins 80 prevent the firing pin's immediate axial movement toward the firing position, but before any noticeable amount of time passes, the energy builds up sufficient magnitude to cause failure of the shear pins and subsequent practically instantaneous movement of the firing pin to the firing position. This movement of the firing pin is facilitated by the axially extending grooves 96 therein (see Figs. 5 and 7). As the pin moves, the outer ends of latches 53 and 53a are withdrawn into upper cap 45, in the manner earlier explained, then firing tip 74 passes through the plug's opening 78 and strikes explosive cartridge 35. Inside that cartridge, the hammer 97 (see Fig. 4A) is moved to detonate the percussion primer 98. Fire from the primer passes through the fire holes 99 to ignite the booster charge 100. Ignition of the booster charge causes disintegration of the retaining disc 101 and results in explosion of the cartridge's main powder charge 102 (illustratively shown in stick form). When this charge is exploded the lower end of the cartridge is blown open (not shown) and gas pressure builds up inside the device. This pressure forces the co-joined inner tube and upper cap to move axially out the outer tube's open end. In so doing, canopy 90 attached to the upper cap is quickly and positively moved from the cockpit opening so that subsequent ejection of the pilot from the airplane may occur in well-known manner.

From the foregoing description and references to the drawings, it will be apparent that we have provided a device for quickly and positively moving the canopy from the cockpit opening of an airplane when emergency exit therefrom during flight becomes necessary; that we have provided a device of the character mentioned which, although mounted ready for use in the airplane, does not interfere with the normal opening and closing of the canopy before and after flight; that we have provided a device whose operation results from action on the device's firing pin of energy supplied in fluid form; and that we have provided a device in which initial movement of the firing pin serves to unlock the device for subsequent operation, and terminal movement of the same firing pin serves to detonate an explosive cartridge for supplying sufficient energy to cause the device's operation and consequent removal of the canopy from the cockpit opening.

Those skilled in the art will realize that out invention is amenable to numerous modifications and variations in structure and operation as well as to many practical applications other than that here disclosed without departing from the spirit and scope of our original concept. For that reason we do not wish to be limited in patent coverage to the comparatively narrow confines inherent in the single embodiment and practical application here described and demonstrated for illustrative purposes only. We prefer, rather, to be limited solely by the metes and bounds of the appended claims.

We claim:

1. A device for moving one object relative to another object; comprising a first tube closed at one end, but open at the opposite end, and adapted for connection to one object; a second tube also closed at one end, but open at the opposite end, a slidably fitting open end foremost into said first tube; the closed end of said second tube being adapted for connection to the other object; an explosive cartridge in said second tube for supplying sufficient energy to move said first and said second tubes axially apart so as to move the one object relative to the other object; a latch in said second tube for selectively locking said first and said second tubes against relative axial movement;

a firing pin slidably accommodated in said second tube and interengaging with said latch, said firing pin serving to hold said latch in the locking position while that pin is in a first position, but further being selectively movable to a second position for successively moving said latch so as to unlock said first and said second tubes for relative axial movement and then acting on said explosive cartridge to cause release of the cartridge's energy; and initiator means for selectively supplying energy to move said firing pin from the first to the second position; whereupon said first and said second tubes are moved apart axially by said explosive cartridge's released energy, thereby moving the one object relative to the other object.

2. The device of claim 1 in which the closed end of the first tube is in the form of a removable cap which is adapted for connection to one of the objects.

3. The combination, in a device for moving a cover from an opening in an object, of: an external tube closed at one end, but open at the opposite end, and adapted for connection to the object; a stop ring in said external tube's open end and defining in conjunction therewith an annular groove inside that tube's open end; an internal tube slidably fitting open end foremost through said stop ring and into said external tube so as to be movable axially relative thereto through that tube's open end, said internal tube's closed end being adapted for connection to the cover; an explosive cartridge in said internal tube for supplying, upon demand, sufficient energy to move said external and said internal tubes axially apart so as to move the cover from the opening; a latch in said internal tube for selectively engaging with the annular groove formed by said external tube and said stop ring so as releasably to lock said external and said internal tubes against relative axial movement; a firing pin slidably supported in said internal tube and interengaging with said latch for holding said latch in the locking position when that pin is in a retracted position, but for moving said latch to unlock said external and said internal tubes for relative axial movement and for acting subsequently on said explosive cartridge to cause release of the cartridge's energy while that pin is moved to a firing position; and initiator means for supplying energy to move said firing pin from the retracted to the firing position; whereupon said external and said internal tubes are moved axially apart by said explosive cartridge's released energy to move the cover from the opening in so doing.

4. The combination of claim 3 plus a bearing tube in the external tube axially adjacent the stop ring, said bearing tube defining an annular groove inside the first tube in conjunction with the stop ring for accommodating the latch when that latch is in the tube locking position, and said bearing tube also serving to slidably support the internal tube.

5. In a device for moving a hatch cover from a hatchway in time of emergency, the combination of: an outer tube; a cap closing one end of said outer tube and adapted for attachment to the hatchway; an inner tube also closed at one end, but open at the opposite end, said inner tube being slidably supported in said outer tube for axial movement relative thereto through the outer tube's open end with said inner tube's open end opposing said outer tube's closed end, the closed end of said inner tube being adapted for attachment to the hatch cover; a bearing tube in said outer tube for slidably supporting said inner tube therein and having an internal annular groove; an explosive cartridge in said inner tube for supplying sufficient energy to move said outer and said inner tubes axially apart, thereby to move the hatch cover from the hatchway; a latch in said inner tube for selectively engaging with said bearing tube's annular groove so as releasably to lock said outer and inner tubes against relative axial movement; a firing pin slidably accommodated in said inner tube and interengaging with said latch, said firing pin serving to retain said latch in the locking position when that pin is in one position and while the pin is being moved to another position, serves to move said latch so as to unlock said outer and inner tubes for relative axial movement and also to act on said explosive cartridge in sequence to cause release of the cartridge's energy; and initiator means selectively operable to supply energy to move said firing pin from one position to the other position; whereupon said outer and inner tubes are moved apart axially by said explosive cartridge's released energy, resulting in movement of the hatch cover from the hatchway.

6. The combination, in a device for moving a hatch cover from a hatchway in time of emergency, of: an outer tube closed at one end, but open at the opposite end, and adapted for connection to the hatchway; an inner tube slidably accommodated in said outer tube for axial movement relative thereto through the outer tube's open end; a cap also slidably supported in said outer tube's open end, said cap being attached to and closing the end of said inner tube proximal said outer tube's open end, part of said cap extending outside said outer tube and being adapted for connection to the hatch cover; an explosive cartridge in said inner tube for supplying energy to move said inner tube and cojoined cap axially relative to said outer tube's open end thereby to move the hatch cover from the hatchway; a latch in said cap for releasably locking said cap and said outer tube against relative axial movement thereby also preventing relative axial movement between said outer and inner tubes; a firing pin slidably accommodated in said cap and interengaging with said latch for holding said latch in position to maintain said cap and said outer tube locked against relative axial movement while that pin is in a first position, but said firing pin being selectively movable to a second position to move said latch so as to unlock said cap and said outer tube for relative axial movement and consecutively to act on said explosive cartridge to cause release of the cartridge's energy; and an initiator for supplying sufficient energy in fluid form to said firing pin to cause that pin's movement from the first to the second position; whereupon said outer tube and said inner tube and cojoined cap are moved apart axially thereby moving the hatch cover from the hatchway.

7. The combination of claim 6 plus a plug seated in the inner tube's end between that tube and the cap, said plug serving to slidably support a portion of the firing pin, to aid in positioning the explosive charge, and to aid in slidably supporting the latch.

8. The combination of claim 6 plus a spacer sleeve in the inner tube, said spacer sleeve serving to hold the explosive cartridge in the inner tube.

9. The combination of claim 8 plus retaining means for holding the spacer sleeve in position in the inner tube.

10. In a device for moving a closure from an opening in a wall, the combination of: an outside tube closed at one end, but open at the opposite end, and adapted for connection to the wall; an inside tube also closed at one end, but open at the opposite end and slidably fitting open end foremost into said outside tube, the closed end of said inside tube being adapted for connection to the closure; an explosive cartridge in said inside tube for supplying energy to move said outside and said inside tubes axially apart from each other so as to move the closure from the opening; a spacer sleeve in said inside tube for positioning said explosive cartridge therein; a plurality of interfitting latches in said inside tube for releasably locking said outside and said inside tubes against relative axial movement; a firing pin in said inside tube normally interengaging said latches to prevent their unlocking said outside and inside tubes, said pin being selectively movable into detonating contact with said explosive cartridge and during such movement serving to move said latches so as to unlock the tubes and permit their relative axial movement; and initiator means selectively operable to supply energy for moving said firing pin from its normal to its cartridge detonating position; whereupon said outside and said inside tubes are moved axially apart by the energy thus liberated from said explosive cartridge with consequent movement of the closure from the opening.

11. In a device for moving the canopy from the cockpit opening of an airplane in time of emergency, the combination of: an external tube; a first cap closing one end of said external tube and adapted for mounting in the cockpit; an internal tube slidably accommodated in said external tube for axial movement relative thereto through the external tube's open end; a bearing tube in said external tube's open end for slidably supporting said internal tube therein; a stop ring also in said external tube's open end, said stop ring defining an annular groove inside said external tube in conjunction with said bearing tube; a sealing member in said bearing tube for sealing the space between that tube's interior surface and said internal tube's exterior surface; a plug seated against said internal tube's end farthermost from said first cap, part of said plug extending outside that end of said internal tube; a second cap, this cap being attached to said internal tube and fitting over said plug to close that end of said internal tube, part of this cap being slidably accommodated in said bearing tube and in said stop ring while the balance of this cap extends outside said external tube's open end and is connected to the canopy; an explosive cartridge in said internal tube abutting said plug, said explosive cartridge serving to supply sufficient energy to move said external tube and said internal tube and cojoined second cap axially apart so as to move the canopy from the cockpit opening; a spacer sleeve in said internal tube for positioning said explosive cartridge; a retaining spring in said internal tube for holding said spacer sleeve in abutment with said explosive cartridge; a plurality of interfitting latches partly in said plug and partly in said second cap for releasably locking that cap and said external tube against relative axial movement by engaging with the annular groove formed by said bearing tube and said stop ring; a firing pin slidably accommodated partly in said second cap, partly in said plug, said firing pin normally interengaging said latches to prevent their unlocking said external tube and said cap, said pin being selectively movable into detonating contact with said explosive cartridge and during such movement serving to move said latches so as to unlock the external tube and the cap to permit their relative axial movement; a sealing ring on said firing pin to slidably seal the space between that pin's exterior surface and said second cap's supporting surface therearound; a plurality of shear pins partly in said second cap, said internal tube, said plug and said firing pin for retaining said second cap on said internal tube, for retaining said plug in position with relation to said second cap, for temporarily holding said firing pin in the first position and also for preventing that pin from acting on said explosive cartridge until those pins are stressed to failure; and an initiator selectively operable to supply sufficient energy to said firing pin to cause failure of said shear pins, then to move said firing pin from the first to the second position; whereupon said external tube and said internal tube and cojoined second cap are moved axially apart by said explosive cartridge's released energy thus moving the cover from the cockpit opening.

References Cited in the file of this patent
UNITED STATES PATENTS

| 1,096,679 | Chronis | May 9, 1914 |
| 1,365,870 | Temple | Jan. 18, 1921 |
| 2,489,984 | Shoemaker | Nov. 29, 1949 |
| 2,491,516 | Piggat et al. | Dec. 20, 1949 |
| 2,516,902 | Musser | Aug. 1, 1950 |

FOREIGN PATENTS

| 609,456 | Great Britain | May 9, 1948 |